R. M. DIXON.
COUPLING HOSE.
APPLICATION FILED OCT. 27, 1902.
918,514.
Patented Apr. 20, 1909.
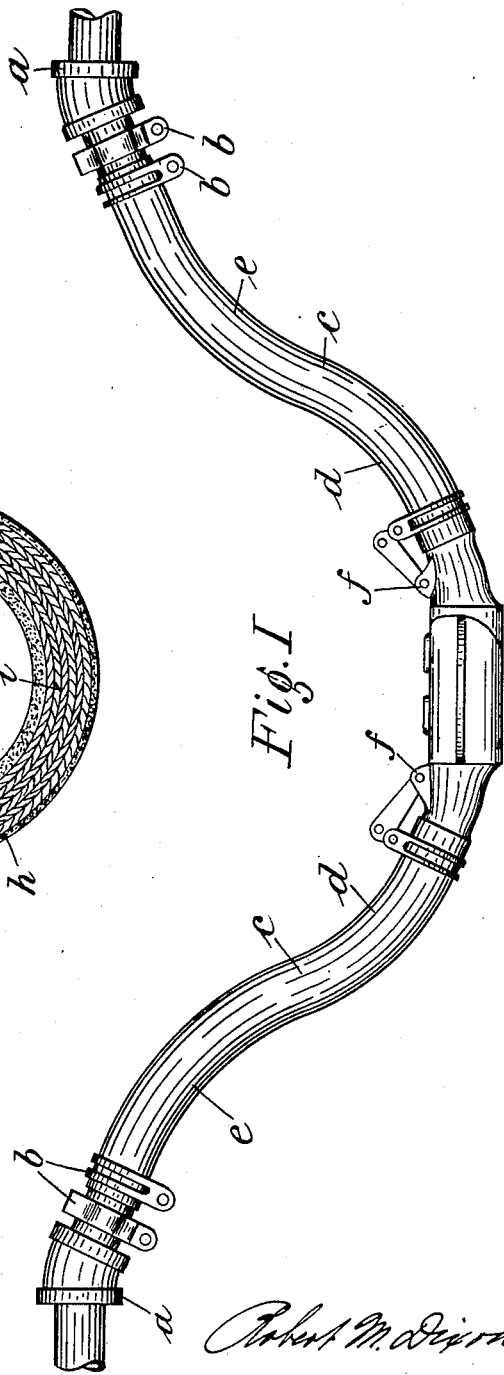
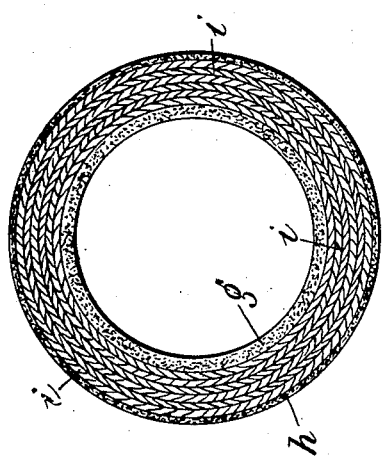
Fig. II
Fig. I
Witnesses
Inventor
Robert M. Dixon
By his Attorneys

UNITED STATES PATENT OFFICE.

ROBERT M. DIXON, OF EAST ORANGE, NEW JERSEY, ASSIGNOR TO THE SAFETY CAR HEATING & LIGHTING COMPANY, A CORPORATION OF NEW JERSEY.

COUPLING-HOSE.

No. 918,514.  Specification of Letters Patent.  Patented April 20, 1909.

Application filed October 27, 1902. Serial No. 128,921.

*To all whom it may concern:*

Be it known that I, ROBERT M. DIXON, a citizen of the United States, residing at East Orange, county of Essex, State of New Jersey, have invented certain new and useful Improvements in Coupler-Hose, of which the following is a specification.

My invention relates to coupler hose and has for its object to produce a structure which will efficiently couple train pipes. The device, however, is capable of other uses and the invention is not limited to the coupling of train pipes.

In the accompanying drawing, I have shown a device in which my invention is embodied.

In this drawing, Figure I is a side elevation of a construction in which one form of my invention is embodied; and Fig. II is a transverse section through the coupler hose showing its preferred construction.

The leading feature of my invention is a flexible hose permanently flexed or bent for the purposes of insuring an efficient coupling action and facilitating coupling and uncoupling.

In the drawing, $a$ indicates diagrammatically the ends of the steam train pipe on adjacent cars. Connected to each of these train pipes in any suitable manner as by means of clamps $b$ or other coupling devices is a section of flexible coupler hose $c$. These coupler hose sections are permanently bent or flexed as for instance at $d$ and $e$ and each is provided with a disengageable coupler $f$ of the ordinary gravity type. In the present instance, I have shown the flexible coupler hose of sinuous or ogee form. The coupler hose may be variously constructed. In Fig. II, I have shown the same as consisting of a rubber lining $g$ and rubber jacket $h$ with intervening plies or layers of duck $i$ which may be of any required number. In the present instance I have shown six plies or layers of duck. The hose is given its permanent flexure by the mandrel upon which it is constructed.

Having described my invention what I claim and desire to secure by Letters Patent is:

1. In construction of the class described, in combination, a pair of coupler hose adapted respectively to make connection with train pipes, and a coupler, parts of which are connected with and adapted to join said hose, each of said hose being flexible as a whole and provided with a permanently bent portion curving toward said coupler.

2. In construction of the class described, in combination, a pair of flexible coupler hose adapted respectively to make connection with train pipes, and a coupler, parts of which are connected with and adapted to join said hose, each of said hose being provided with a permanently bent portion curving toward said coupler and another permanently bent portion curving toward the corresponding train pipe.

3. In construction of the class described, in combination, a pair of coupler hose adapted respectively to make connection with train pipes, a coupler, parts of which are connected with and adapted to join said hose, each of said hose being provided with a permanently bent portion curving toward said coupler and another permanently bent portion curving toward the corresponding train pipe, and a flexible portion intermediate said bent portions.

4. In construction of the class described, in combination, a pair of flexible coupler hose adapted respectively to make connection with train pipes, and a coupler, parts of which are connected with and adapted to join said hose, each of said hose being provided with a permanently bent portion curving toward said coupler.

5. In construction of the class described, in combination, a pair of flexible coupler hose adapted respectively to make connection with train pipes and hang downwardly therefrom, and a coupler of the gravity type, parts of which are connected with and adapted to join said hose, each of said hose being provided with a permanently bent portion curving toward said coupler.

6. In construction of the class described, in combination, a pair of flexible coupler hose adapted respectively to make connection with train pipes and hang downwardly therefrom, and a coupler of the gravity type, parts of which are connected with and adapted to join said hose, each of said hose being provided with a permanently bent portion curving toward said coupler and being flexible as a whole.

7. In a device of the class described, a coupler hose having two oppositely-disposed permanent bends and an intermediate relatively flexible portion.

R. M. DIXON.

Witnesses:
FREDERICK E. KESSINGER,
ELMER E. ALLBEE.